(12) United States Patent
Izumi et al.

(10) Patent No.: US 6,456,683 B1
(45) Date of Patent: Sep. 24, 2002

(54) METHOD AND APPARATUS FOR DEIONIZING CONDENSATE

(75) Inventors: Takeshi Izumi; Masahiro Hagiwara, both of Kanagawa-ken (JP)

(73) Assignee: Ebara Corporation, Tokyo (JP)

( * ) Notice: Subject to any disclaimer, the term of this patent is extended or adjusted under 35 U.S.C. 154(b) by 0 days.

(21) Appl. No.: 09/325,745

(22) Filed: Jun. 4, 1999

(30) Foreign Application Priority Data

Jun. 4, 1998 (JP) .......................................... 10-156188

(51) Int. Cl.[7] .............................................. G21C 19/30
(52) U.S. Cl. ...................... 376/313; 376/310; 210/660; 210/634; 210/635; 210/638; 521/25
(58) Field of Search ................. 376/310, 313; 210/660, 634, 635, 636; 521/25

(56) References Cited

U.S. PATENT DOCUMENTS

| | | | | |
|---|---|---|---|---|
| 4,053,397 A | * | 10/1977 | Flynn .......................... | 210/34 |
| 4,564,644 A | * | 1/1986 | Harris .......................... | 512/28 |
| 4,657,731 A | * | 4/1987 | Otte et al. .................. | 376/313 |
| 4,975,201 A | * | 12/1990 | Ma ............................ | 210/686 |
| 5,013,522 A | * | 5/1991 | Granath et al. ............. | 376/310 |
| 5,132,019 A | * | 7/1992 | Fejes .......................... | 210/660 |
| 5,192,446 A | * | 3/1993 | Salem et al. ................ | 210/685 |
| 5,231,115 A | * | 7/1993 | Harris .......................... | 521/28 |
| 5,377,234 A | * | 12/1994 | Robles et al. ............... | 376/254 |
| 5,387,348 A | * | 2/1995 | Hiagiwara et al. .......... | 210/662 |
| 5,397,477 A | * | 3/1995 | Salem et al. ................ | 210/683 |
| 5,891,328 A | * | 4/1999 | Goldstein ................ | 210/321.6 |
| 6,136,199 A | * | 10/2000 | SenGupta et al. .......... | 210/670 |
| 6,187,201 B1 | * | 2/2001 | Abe et al. .................... | 210/652 |

FOREIGN PATENT DOCUMENTS

| | | | | |
|---|---|---|---|---|
| JP | | 404244207 A | * 9/1992 | |
| JP | | 408224579 A | * 9/1996 | ............. G21F/9/12 |

OTHER PUBLICATIONS

Yamaguchi et al, 'Compact hollow fibre filter creates no secondary waste' Nuclear Engineering International., Oct. 1988, pp. 28 to 30.*

Izumi et al, "Performance Of High Crosslinkage Gel Type Cation Exchange Resins For Condensate Polishers", pp. 1–5.

* cited by examiner

Primary Examiner—Michael J. Carone
Assistant Examiner—John Richardson
(74) Attorney, Agent, or Firm—Armstrong, Westerman & Hattori, LLP

(57) ABSTRACT

A method and an apparatus for deionizing water are disclosed. A condensate in the secondary cooling water system in a PWR nuclear power plant is passed through a mixture of an anion exchange resin and a cation exchange resin having a crosslinking degree of about 12 to 16%. The cation exchange resin has an improved, ion exchange capacity. thereby decreasing the frequency of changing the condensate.

7 Claims, 9 Drawing Sheets

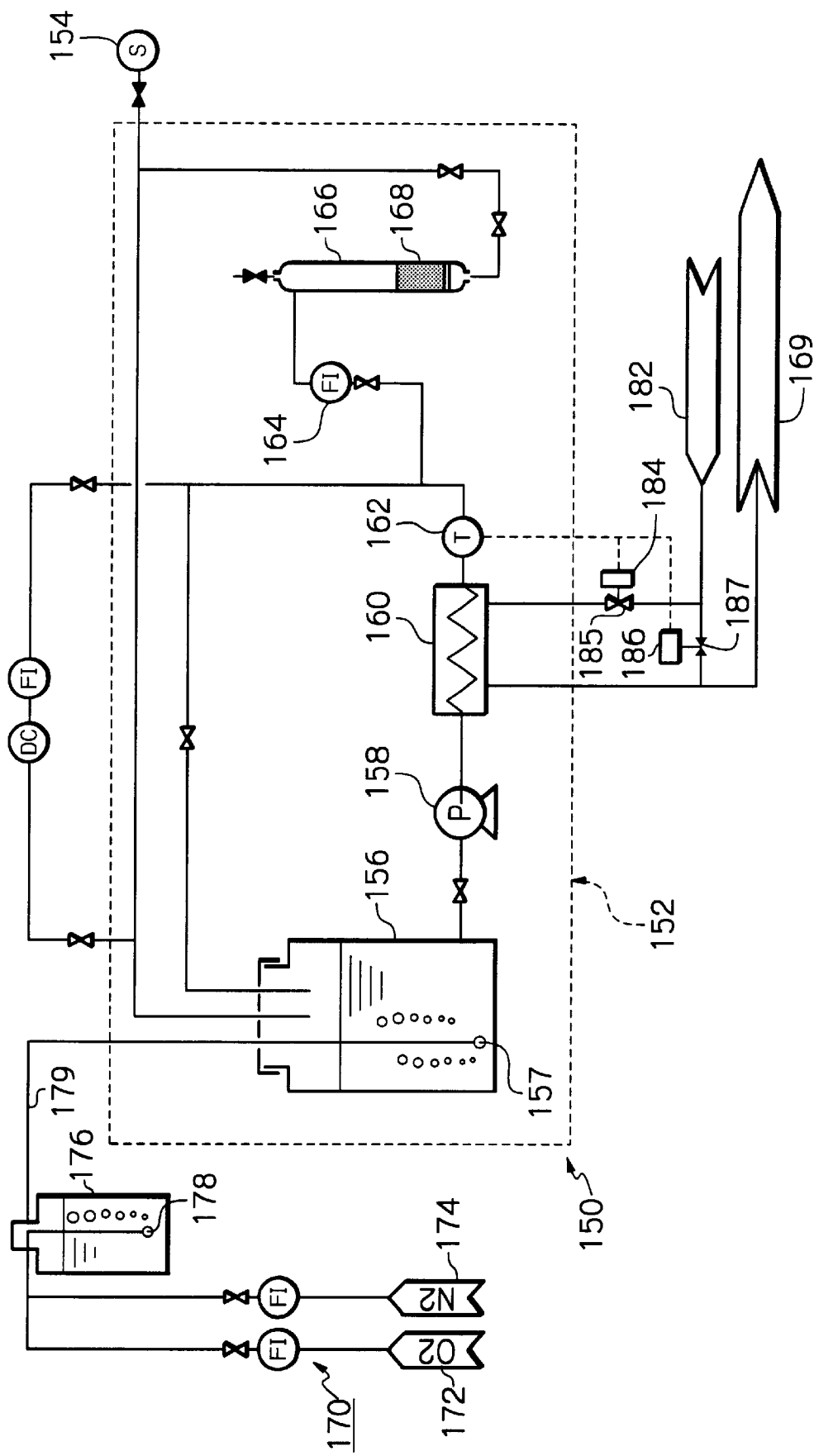

METHOD AND APPARATUS FOR DEIONIZING CONDENSATE

BACKGROUND OF THE INVENTION

The present invention relates to a method and an apparatus for deionizing water, such as a condensate in a secondary cooling water system of a pressurized water reactor (PWR) nuclear power plant.

A nuclear power plant may have a pressurized water reactor (PWR). In the PWR, the reactor generates heat, which is transferred into primary coolant. The heat in the primary coolant is further transferred into secondary cooling water through a heat exchanger. The heat in the primary coolant boils the secondary cooling water, thereby rotating a turbine for generating electricity. In other words, the heat exchanger serves as a steam generator for the secondary cooling water. The steam is cooled to a liquid, and the secondary cooling water circulates in the secondary cooling water system. However, the deposition of a scale in the heat exchanger can prevent smooth generation of electricity. There is provided in the secondary cooling water system an apparatus for deionizing a condensate containing an ion exchange resin so as to remove trace ions in the secondary cooling water.

Conventionally, the ion exchange resin used in the apparatus for deionizing the condensate is a gel-type ion exchange resin having a crosslinking degree of 8 to 10% or a porous-type ion exchange resin having an exchange capacity being equivalent to the gel-type ion exchange resin However, the conventional ion exchange resins have a problem that the ion exchange capacity is limited. Therefore, a regenerant is required to pass through the ion exchange resin to regenerate and wash the ion exchange resin. The procedures make the operation of generating electricity cumbersome, thereby increasing operation costs. Furthermore, during the regeneration of the ion exchange resin by the regenerant, the regenerant may remain in the ion exchange resin, which could elute into the secondary cooling water system during the operation of introducing fresh, secondary cooling water into the system, thereby decreasing the quality thereof. Similarly, organic impurities eluted off from the resin decrease the quality of the condensate.

The whole disclosures of U.S. Pat. Nos. 5,788,828, 5,593,554, 4,814,281 and 4,251,219 are incorporated herein as reference.

SUMMARY OF THE INVENTION

In view of the aforementioned problem, one aspect of the present invention provides a method and an apparatus for deionizing a condensate in a secondary cooling water system in a PWR nuclear power plant, which allows the condensate to circulate for a longer period of time and to improve the quality of the condensate.

In accordance with one aspect of the present invention, there is provided a method for deionizing water, comprising the steps of:

providing a nuclear power plant comprising a pressurized water reactor, a primary coolant system operatably connected to the pressurized water reactor, and a secondary cooling water system operatably connected to the primary coolant system; and passing a condensate in the secondary cooling water system through a mixture of an anion exchange resin and a cation exchange resin having a crosslinking degree of about 12 to 16%.

Preferably, the anion exchange resin and the cation exchange resin form a bed. The cation exchange resin may have a crosslinking degree of about 14%. The cation exchange resin may be a gel type. Preferably, the cation exchange resin comprises a plurality of particles having a substantially uniform particle diameter.

Preferably, the method further comprises the step of passing the condensate through a prefilter whereafter the condensate passed through the prefilter is passed through the mixed bed. The prefilter may comprise at least one of a filter assembly containing hollow-fiber membranes, a filter assembly containing a precoatable filter element and a filter assembly containing a pleated, filter element.

According to the second aspect of the present invention, there is provided an apparatus for deionizing water, comprising:

a secondary cooling water system for a PWR nuclear power plant having a mixture of an anion exchange resin and a cation exchange: resin having a crosslinking degree of about 12 to 16% therein.

Preferably, the anion exchange resin and the cation exchange resin forms a bed. Preferably, the cation exchange resin is a gel type. The cation exchange resin may have a crosslinking degree of about 14%. The cation exchange resin may comprise a plurality of particles having a substantially uniform particle diameter.

Preferably, the secondary cooling water system further comprises a prefilter upstream of the mixed bed. The prefilter may comprise at least one of a filter assembly containing hollow-fiber membranes, a filter assembly containing a precoatable filter element and a filter assembly containing a pleated, filter element.

BRIEF DESCRIPTION OF THE DRAWINGS

FIG. 11 is a schematic view showing another type of a testing apparatus.

DETAILED DESCRIPTION OF THE INVENTION

Figure 1:
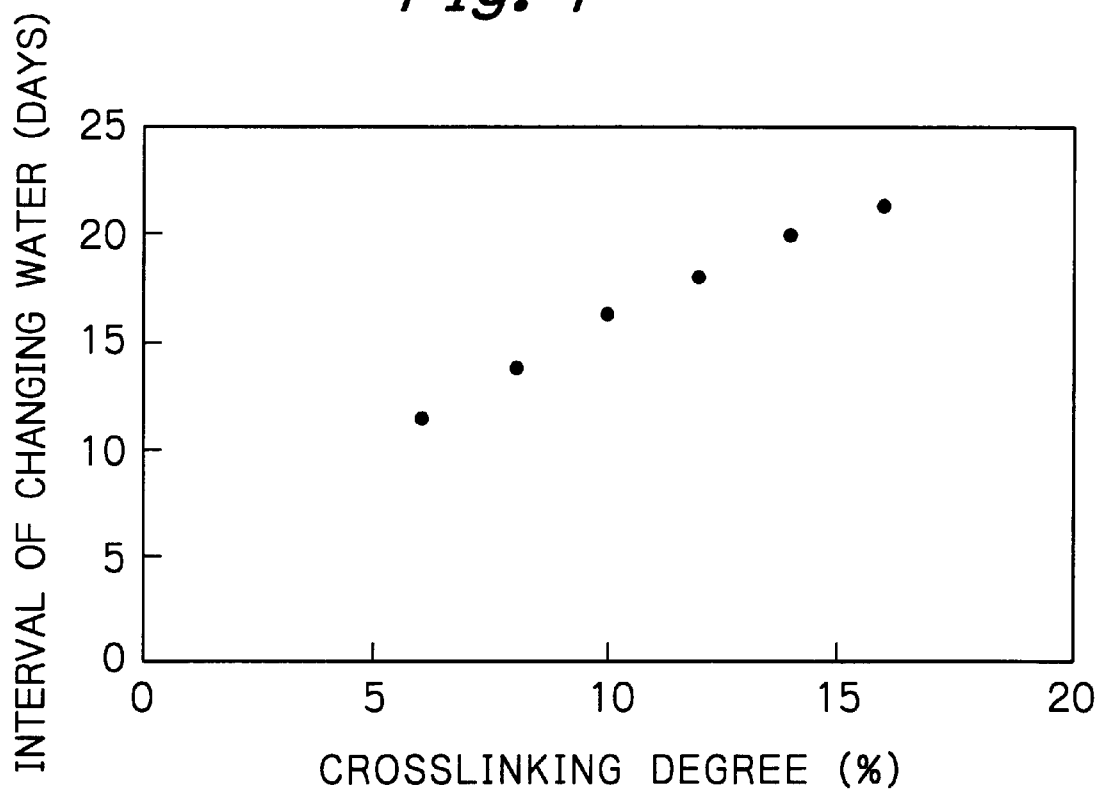
FIG. 1 is a graph showing the correlation between the crosslinking degree of the cation exchange resin and a frequency of regeneration was investigated.

Preferred embodiments of the present invention are described hereinafter. However, the present invention is not limited to the preferred embodiments.

In one embodiment of the present invention, a mixed bed containing an anion exchange resin and a cation exchange resin is used. The ion exchange resins may have a framework including a copolymer of styrene and divinylbenzene. The anion exchange resin may have a basic functional group, preferably strongly basic functional group such as a tertiary ammonium group in the copolymer. The cation exchange resin may have an acidic functional group, preferably strongly acidic functional group such as a sulfonic group ($-SO_3H$).

The cation exchange resin may have a divinylbenzene content of about 12 to 16%, preferably about 14%. In other words, the cation exchange resin may have a crosslinking degree of about 12 to 16%. When the crosslinking degree is less than about 12%, the exchange capacity is limited, and therefore it is disadvantageous. On the other hand, when the crosslinking degree is more than about, 16% the reaction rate for exchanging ions decreases, and the ion exchange capacity decreases also. Moreover, when the ion exchange resin is regenerated by passing through the regenerant, the regenerating characteristic is limited, and it is difficult to regenerate the ion exchange resin. Therefore, it is not preferable. Conversely, when the crosslinking degree ranges from about 12 to 16%, the ion exchange resin has an improved, ion exchange capacity, and therefore, it is preferable. Moreover, there is a decreased amount of organic impurities dissolved from the ion exchange resin, thereby allowing purity and the quality of the condensate to be maintained.

The cation exchange resin may have a particle diameter of about 500 to 1000 micrometer, preferably about 550 to 800 micrometer. The cation exchange resin is preferably composed of a plurality of particles having a substantially uniform particle diameter.

Similarly, the anion exchange resin may have particle configurations having a particle diameter of about 500 to 1000 micrometer, preferably about 550 to 800 micrometer. The anion exchange resin is preferably composed of a plurality of particles having a substantially uniform particle diameter.

Preferably, the cation exchange resin is a gel type. For example, when the cation exchange resin has particle configurations, each of the individual particle may have a substantially uniform structure. In contrast, when the cation exchange resin is porous, each of the individual particle may not have a substantially uniform structure, and pores may be formed in each of the individual particles.

An apparatus for deionizing a condensate may have an inlet for a secondary cooling water, a prefilter in a side of the prefilter for filtrating the secondary cooling water, and a mixed bed of the cation exchange resin and the anion exchange resin for removing ions in the secondary cooling water passed from the prefilter. The prefilter may be a filter assembly containing hollow-fiber membranes, a filter assembly containing a precoatable filter element, or a filter assembly containing a pleated, filter element.

Figure 5:
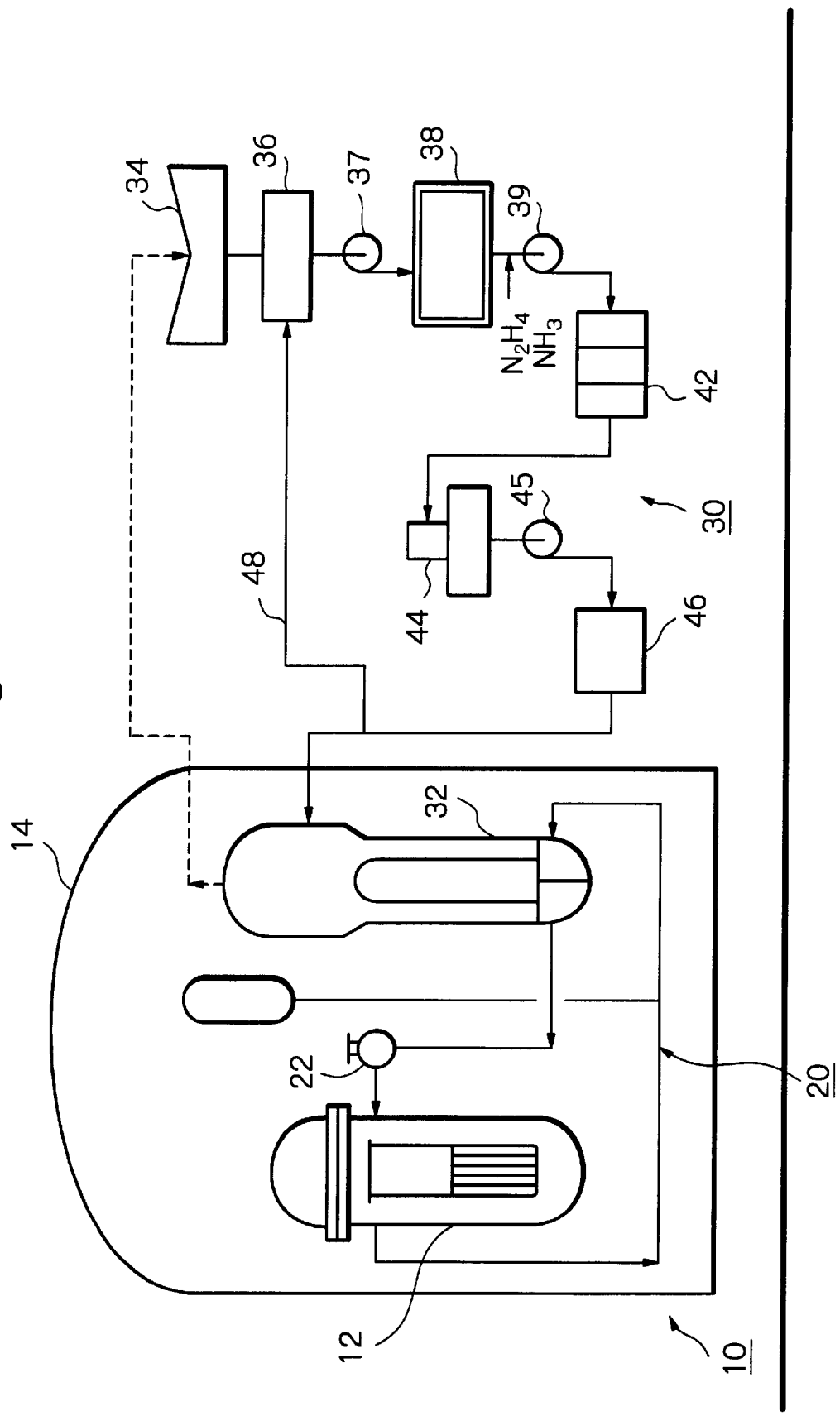
FIG. 5 is a schematic view showing an embodiment of a nuclear power plant.
Figure 6:
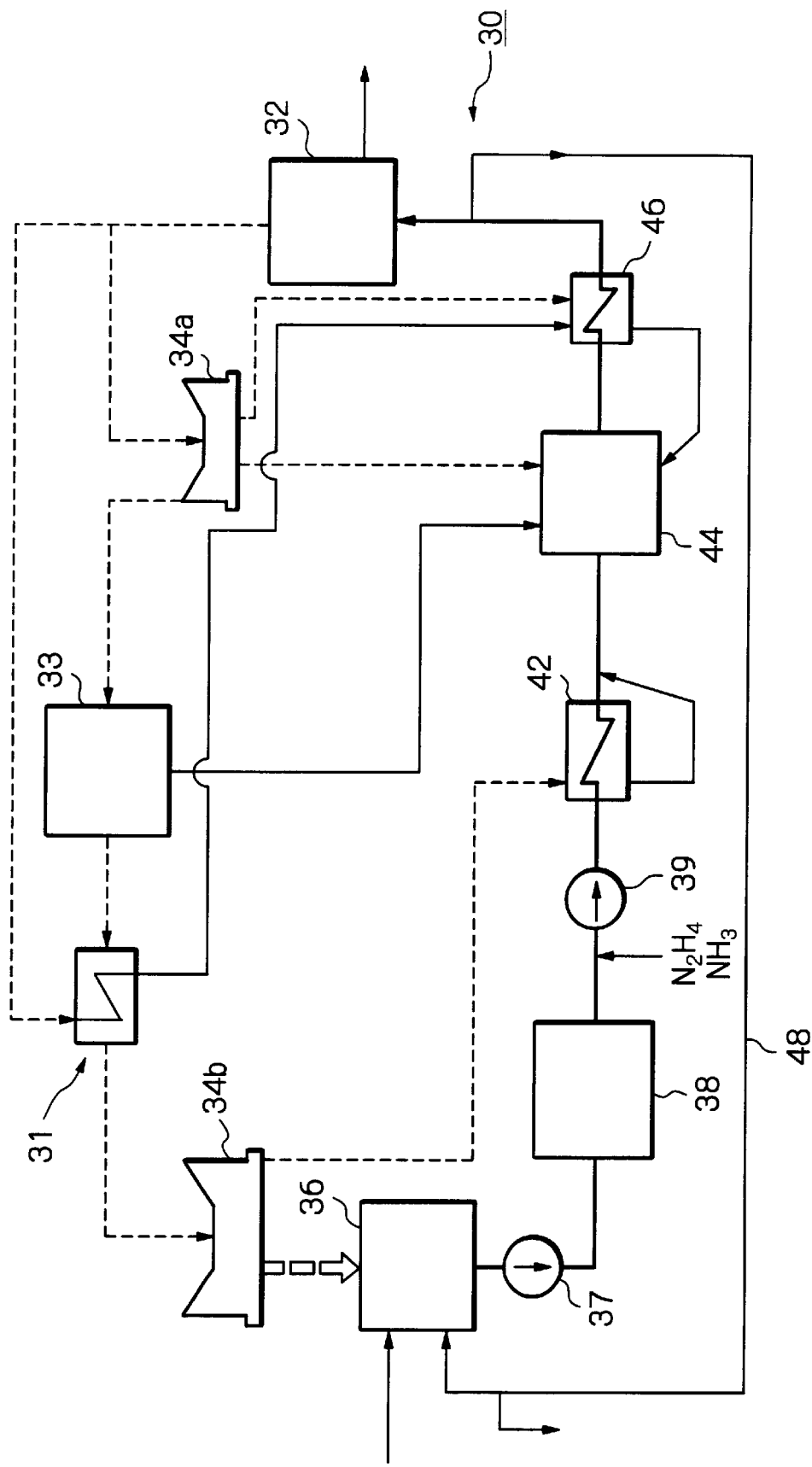
FIG. 6 is a schematic view showing an embodiment of a secondary cooling water system.

FIG. 5 shows an embodiment of a nuclear power plant 10, and FIG. 6 shows an embodiment of a secondary cooling water system 30. In FIGS. 5 and 6, reference numerals 37, 39 and 45 refer to pumps. In FIG. 5, the nuclear power plant has a containment vessel 14 and a pressurized water reactor 12 in the containment vessel 14. The reactor 12 generates heat, which is transferred into a primary coolant in the primary coolant system 20. The system 20 has a pump 22, and the primary coolant circulates in the system by the pump 22. The heat in the primary coolant is further transferred into secondary cooling water through a heat exchanger, serving as a steam generator 32. The steam generator 32 boils the secondary cooling water, thereby rotating a turbine 34 for generating electricity. A condenser 36 forms a condensate from the steam used in the turbine 34. Ions or minerals in the condensate are removed by a condensate demineralizer 38. To the demineralized condensate is added, if desired, hydrazine and ammonia. The condensate is heated by a low pressure heater 42 and then degassed by a degasifier 44 and further heated by a high pressure heater 46. In other words, the secondary coolant system 20 may have the steam generator 32, a turbine 34 for generating electricity, a condenser 34 for forming a condensate, and a condensate demineralizer 36 for removing ions in the condensate.

In FIG. 6, reference numerals 34a and 34b refer to a high pressure turbine and a low pressure turbine, respectively. Reference numerals 31 and 33 refer to a heater and demister, respectively. The steam generator 32 generates steam, and a portion of the steam is introduced into the high pressure turbine 34a. The steam discharged from the turbine 34a is passed through a demister 33 to remove a mist, and the dried, steam from the demister 33 is heated by the heater 31. The heated, steam is introduced into the low pressure turbine 34b, and the steam is introduced into the condenser 36 for changing the steam to a condensate.

Figure 7:
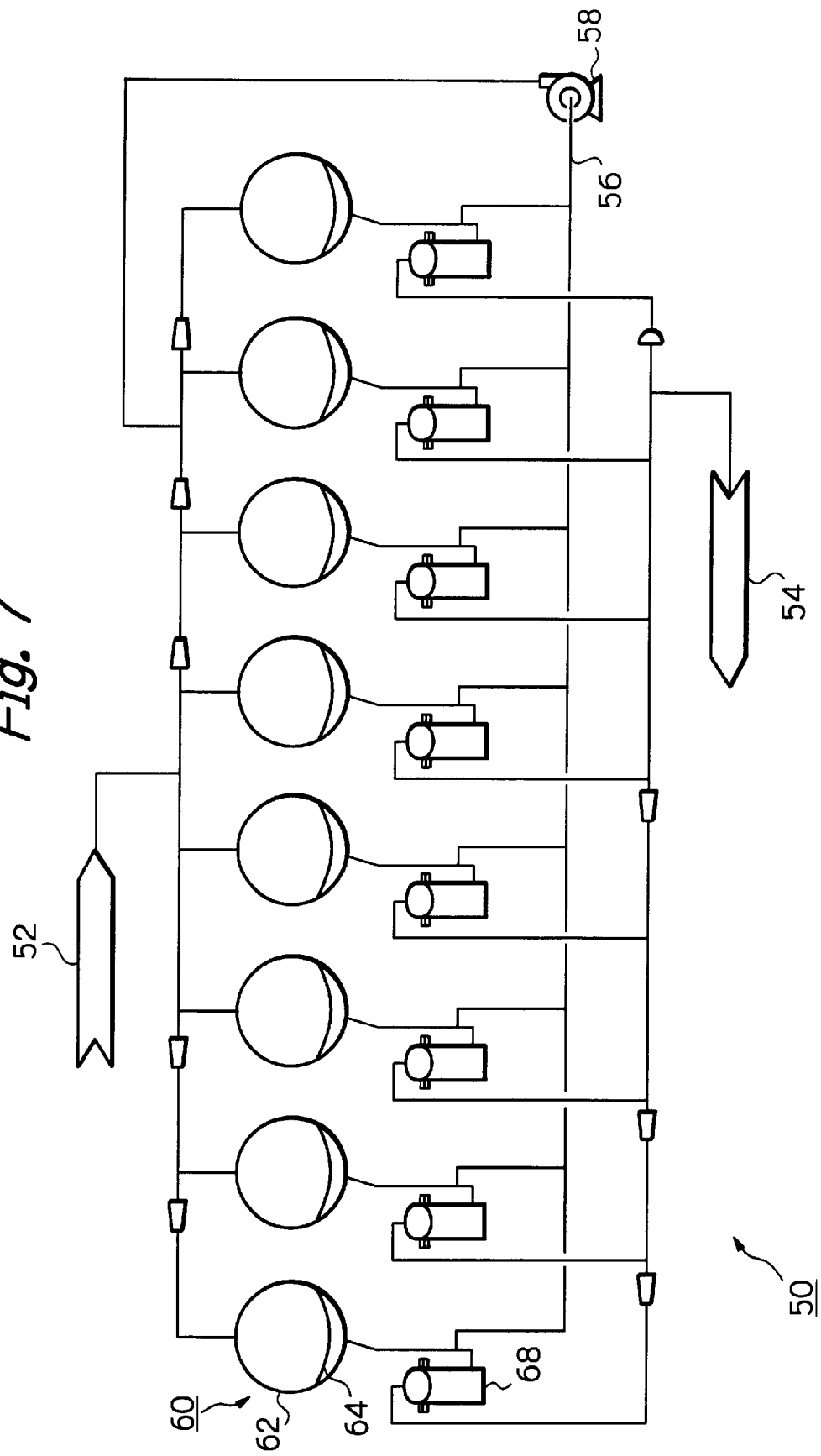
FIG. 7 is a schematic view showing an embodiment of a condensate demineralizer.

FIG. 7 shows;one embodiment of a condensate demineralizer 50 or an apparatus for deionizing water. The condensate demineralizer 50 has an inlet 52 for introducing a condensate, an outlet 54 for discharging a demineralized condensate, and a plurality of demineralizing units 60 being fluidly communicated with the inlet 52 and the outlet 54. Each of the demineralizing units 60 may have a demineralizing vessel 62 and a strainer 68 for trapping a resin, which is disposed in downstream of the demineralizing vessel 62. The demineralizing vessel 62 may contain a mixed bed of a cation exchange resin, which may have particle configurations, and an anion exchange resin, which may have particle configurations. The demineralizing vessel 62 may further contain a screen 64 for holding the mixed bed. When the screen 64 is broken, for example, a portion of the mixed bed of the resins leaks from the demineralizing vessel 62. The strainer 68 traps the leaked resins.

One or some of the demineralizing units 60 may be auxiliary, and the condensate may not pass through the auxiliary demineralizing unit 60 in the steady state.

The condensate demineralizer system may have a recirculating header 56 and a recirculating pump 58. During the steady state,a condensate passes through main demineralizing units 60 but not the auxiliary demineralizing unit 60. In the main demineralizing units 60, the condensate passes through the mixed bed of the resins, and minerals therein are removed. The condensate further passes through the screen 64 and then passes through the strainer 68, followed by discharging from the outlet 54.

When the auxiliary demineralizing unit 60 starts operating, the condensate passed through the auxiliary demineralizing unit 60 is introduced into the circulating header 56 by means of the recirculating pump 58, and then reintroduced into the main demineralizing units 60. The condensate that has been kept in the auxiliary demineralizing unit 60 may have lower quality, and therefore, cleaned by circulating thereof.

Figure 8:
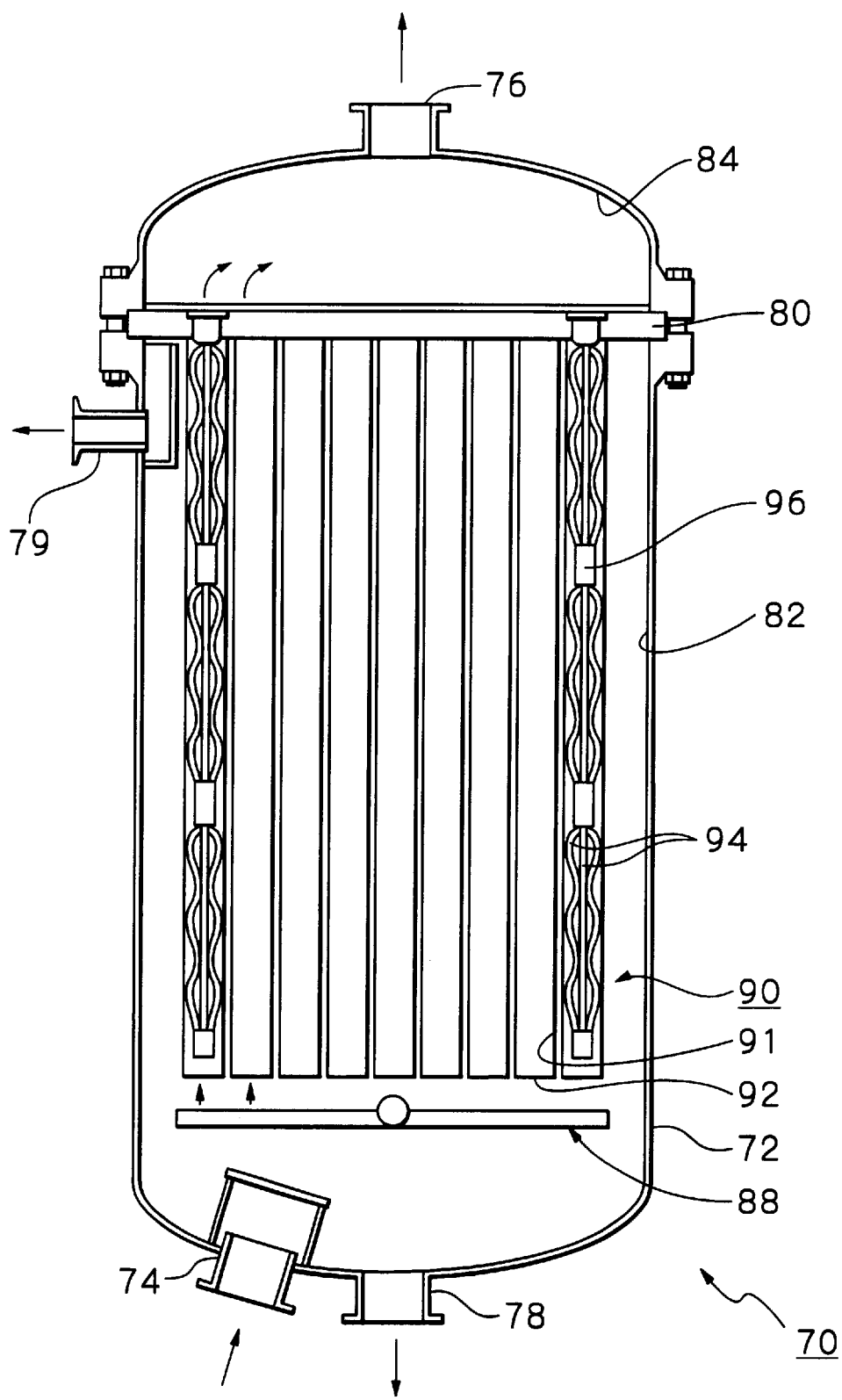
FIG. 8 is a cross-sectional view showing an embodiment of a filter assembly containing hollow-fiber membranes.

FIG. 8 shows one embodiment of a filter assembly containing hollow fiber membranes. The filter assembly 70 may have a housing 72, a liquid inlet 74, a liquid outlet 76, a drain 78, and a vent 79. The filter assembly 70 may have a partition 80 such as a tube sheet separating a feed chamber 82 from a filtrate chamber 84.

A plurality of protective tubes 90 are disposed in the feed chamber 82. Each of the protective tubes 90 may define a bore 91 therethrough and have an open end 92 being communicated with the bore 91 and the feed chamber 82. Each of the protective tubes 90 may contain a plurality of hollow fiber membranes 94 in the bore 91. The hollow fiber membranes may be bundled together by at least one band 96. The hollow defined by each of the hollow fiber membranes communicates with the filtrate chamber 84 through the partition 80 such as a tube sheet. In other words, one end of the hollow fiber membranes is closed while the other end of the hollow fiber membranes is open to the filtrate chamber 84.

A bubbling tube 88 may be disposed in the feed chamber 82 preferably between the liquid inlet 74 and the open ends 92 of the protective tubes 90.

A condensate is introduced into the liquid inlet 74 and then into the feed chamber 82. The condensate is further introduced into the open ends 92 of the protective tubes 90. The condensate permeates through hollow fiber membranes 90 into hollows therein and is transported to the filtrate chamber 84. The filtrated, condensate in the filtrate chamber 84 is discharged from the liquid outlet 76.

Figure 9:
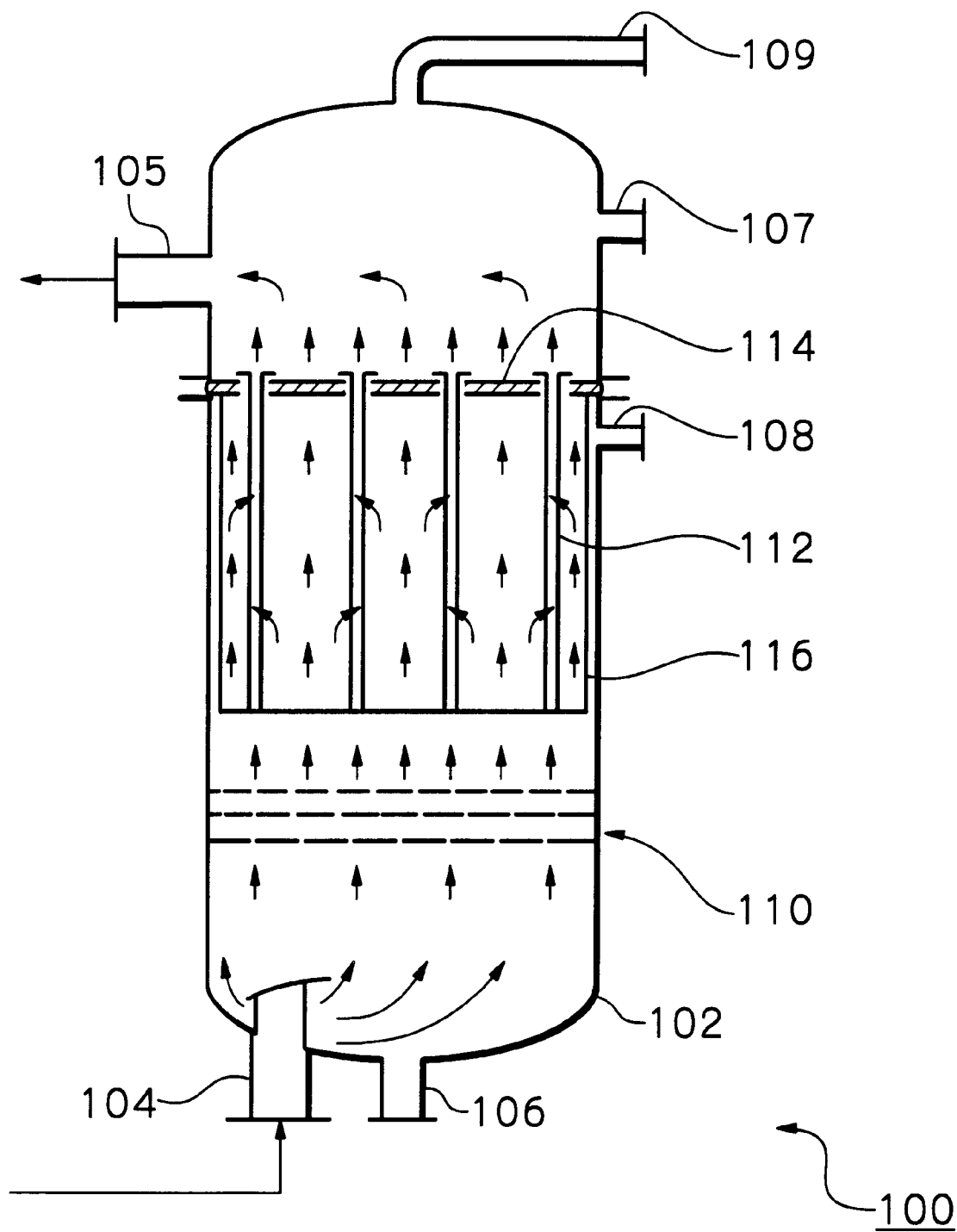
FIG. 9 is a cross-sectional view showing an embodiment of a filter assembly containing a precoatable filter element.

FIG. 9 shows one embodiment of a filter assembly containing a precoatable filter element. The filter assembly 100 may have a housing 102, a liquid inlet 104, a liquid outlet 105, drains 106, 107, and vents 108, 109. The filter assembly 100 may have a plurality of perforated plates 110 for adjusting directions of liquid flows.

The filter assembly 100 has a plurality of precoatable filter elements 112. Each of the filter elements 112 may be formed of a metallic net in cylindrical configurations. Each of the filter element 112 defines a bore therethrough, and the bore communicates with the filtrate chamber. One end of the filter elements 112 may be connected by a partition 114 such as a tube sheet, thereby separating a feed chamber from a filtrate chamber. The surfaces of the net of the filter elements 112 are precoated with a resin to form a precoat layer. The precoatable filter elements 112 may be bundled together to form a bundle 116. When the precoatable filter elements 112 are plugged, the precoatable filter element 112 is backwashed to peel off the precoat layer.

A condensate is introduced into the liquid inlet 104 and passes through the perforated plates 110. The condensate permeates through the precoat layer and the filter elements 112 to the filtrate chamber. The filtrated, condensate in the filtrate chamber is discharged from the liquid outlet 105.

A filter assembly containing a pleated, filter element is known in the art.

EXAMPLE

Figure 10:
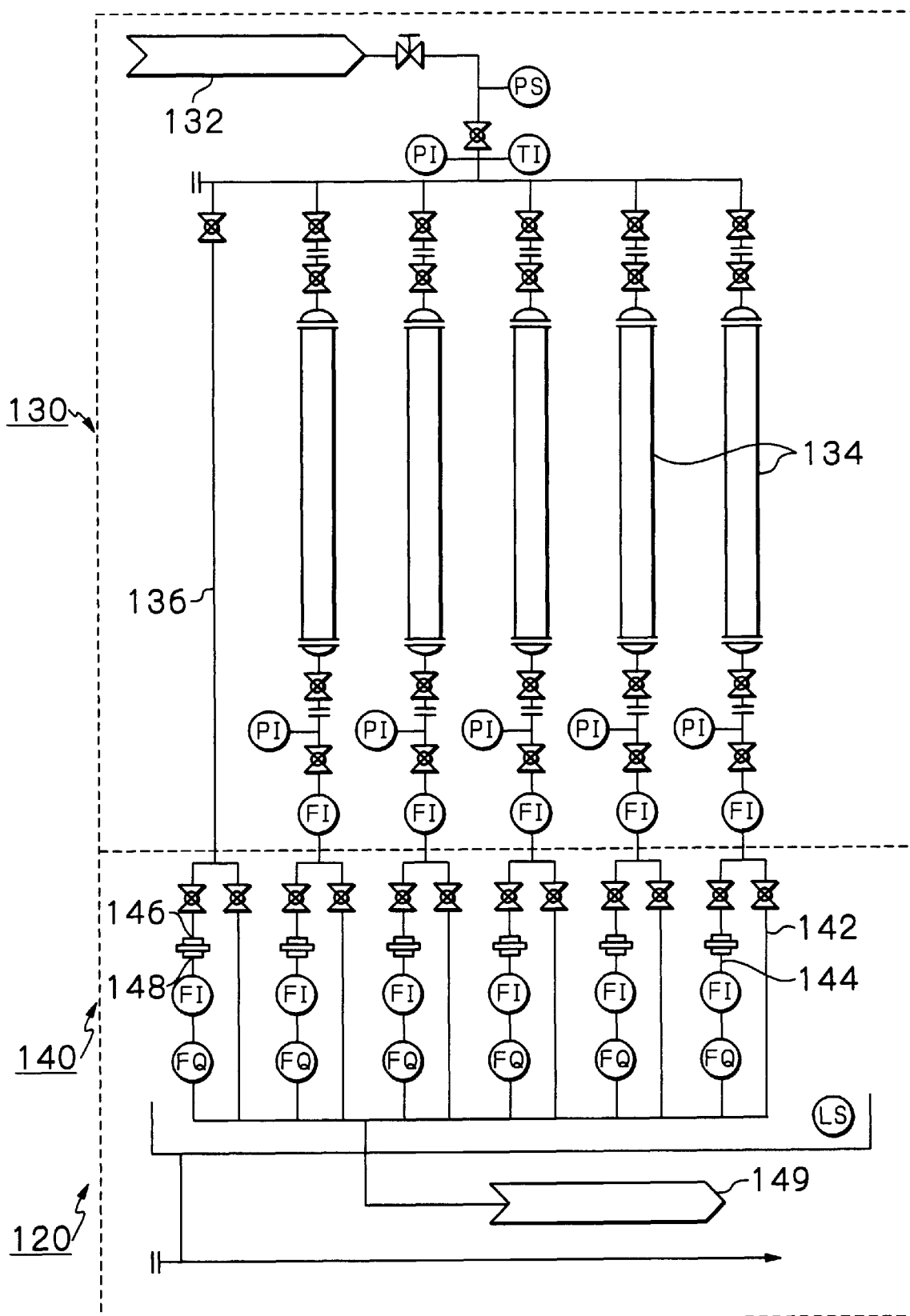
FIG. 10 is a schematic view showing one type of a testing apparatus.

A testing apparatus 120 as shown in FIG. 10 was used in Examples 1 to 3. In FIG. 10, the apparatus 120 has a column unit 130 and a sampling unit 140. In FIG. 10, PI and TI stands for a pressure indicator and a thermometer, respectively. FI and FQ stands for a flow indicator and a volume indicator, respectively. PS and LS stands for a pressure switch and a level switch. The pressure switch prevents an excessive pressure build up in the column unit 130.

A condensate may be introduced into the column unit 130 through an inlet 132 and may be passed through columns 134, each of which may contain an ion exchange resin.

A filtrate which passed through each of the columns is analyzed in the sampling unit 140. The filtrate is passed through a milipore filter 146, which may be a microporous filter element, for trapping residues such as the ion exchange resin and an ion exchange filter 148 for determining an ion content therein. The column units 130 has a line 136, which allows to determine the amount of residues and the ion content in the original, condensate.

Example 1

Correlation, between the crosslinking degree of the cation exchange resin and a frequency of regeneration was investigated.

Six cation exchange resins having varying crosslinking degrees were used The cation exchange resins having crosslinking degree of 6%, 8% and 10% are commercially available from Dow Chemical under trade names of ETR-C, HCR-W2 and MS650CN, respectively. The cation exchange resins having crosslinking degrees of 12%, 14% and 16% were produced by a standard method. All of the cation exchange resins have a framework including a copolymer of styrene and divinylbenzene wherein a sulfonic group is bonded to benzene rings. An anion exchange resin was commercially available from Dow Chemical under the trade name of MS550AN.

A testing apparatus containing a column having an inner diameter of 25 mm was used. Two portions by volume of one of the six cation exchange resins were mixed with one portion by volume of the anion exchange resin, and the mixture was packed in the column of the testing apparatus to form a mixed bed having a height of about 1 meter. The six cation exchange resins are the same except for the crosslinking degree.

Water containing ammonia and other impurities, which had a conductivity of about 4 microsiemens per second, was kept passing through the column at a liner velocity of 85 meter per hour, which is a typical value for the apparatus for deionizing a condensate in a PWR nuclear power plant. At the same time the conductivity of water at the outlet of the column was monitored to determine a period of time when the conductivity of water at the outlet reaches 0.1 microsiemens per second.

The results are shown in FIG. 1. FIG. 1 shows that the cation exchange resin having higher crosslinking degree remains operational for a longer period of time, thereby allowing to regenerate the resin less frequently.

Example 2

Correlation between the crosslinking degree of the cation exchange resin and a reaction rate was investigated.

A testing apparatus containing a column having an inner diameter of 16 mm was used. One of the six cation exchange resins was packed in the column of the testing apparatus to have a height of exactly 1 cm. The six cation exchange resins are the same as those used in Example 1.

Water containing about 18 ppm of NaCl as impurities was passed through the column at a liner velocity of 120 meter per hour. At the same time, the concentrations of sodium chloride in the water at the inlet and the outlet of the column were monitored. A rate of removing the sodium chloride was determined, and the rate was regarded as the reaction rate.

Figure 2:
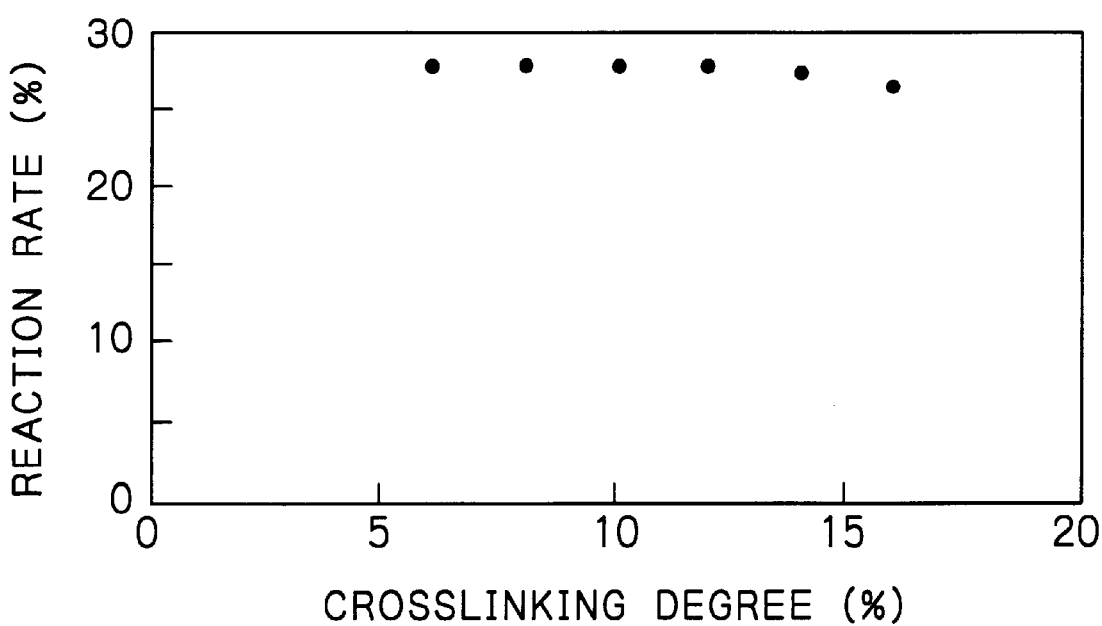
FIG. 2 is a graph showing the correlation between the crosslinking degree of the cation exchange resin and a reaction rate.

The results are shown in FIG. 2. FIG. 2 shows that the cation exchange resins having crosslinking degrees up to about 16% have satisfactory performance.

Example 3

Correlation between a degree of regeneration in the cation exchange resin and a regenerated, ion exchange capacity of the cation exchange resin was investigated.

A testing apparatus containing a column having an inner diameter of 25 mm was used. One of the six cation exchange resins was packed in the column of the testing apparatus to have a height of about 10 cm. The six cation exchange resins are the same as those used in Example 1.

The cation exchange resin was saturated with sodium ion to Na-type, and then 1N HCl was passed through the column at a space velocity of about 5 per hour until the elutant amounts to equivalents of 100 g, 150 g and 200 g of pure HCl. Subsequently, the ion exchange capacity of the regenerated cation exchange resin was determined to give a degree of regeneration.

Figure 3:
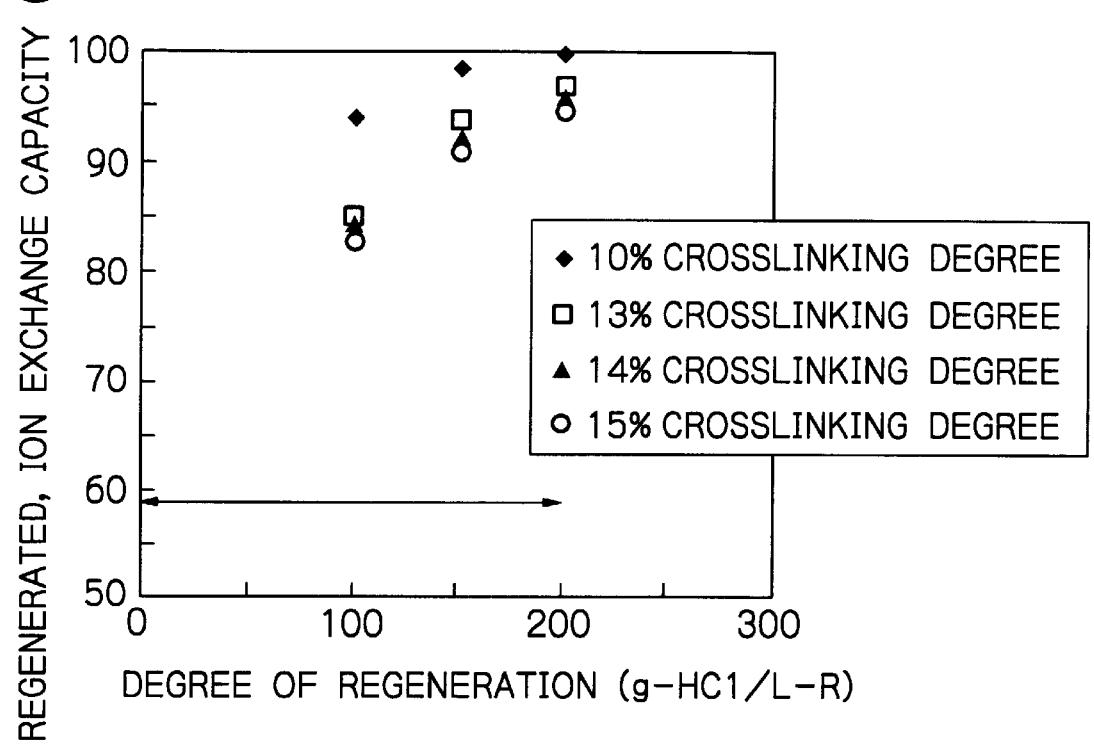
FIG. 3 is a graph showing the correlation between a degree of regeneration in the cation exchange resin and a regenerated, ion exchange capacity of the cation exchange resin.

The results are shown in FIG. 3. FIG. 3 shows that some of the cation exchange resins having very high degrees of crosslinking may not regenerate easily. However, usually, the degree of regeneration has a large margin in real design, and therefore, the results are satisfactory in actually operating the deionizing apparatus.

"L-R" in FIG. 3 shows a volume of an ion exchange resin.

Example 4

Correlation between the crosslinking degree of the cation exchange resin and a rate of eluting organic impurities therefrom was investigated.

A testing apparatus 150 containing a column having an inner diameter of 25 mm was used. In FIG. 11, FI refers to a flow indicator, T refers to a thermostat, and P refers to a pump. In FIG. 11, the testing apparatus has a seal box 152 made of an acrylate resin. The seal box has a sample inlet 154 and a reciruclutaling line. The recirculating line has a tank 156 connected to the sample inlet 154, a recirculating pump 158, a glass condenser 160, a thermostat 162, a flow indicator 164, and a glass column 166 containing an ion exchange resin 168.

The thermostat 162 controls temperature of the water in the recirculating line. When the thermostat 162 detects that the temperature of the recirculating line is not warm, the thermostat 1162 outputs a signal for a temperature controller 184 so that the controller 184 opens a valve 185. At the same time, the thermostat 162 outputs a signal to a temperature controller 186 so that the controller 186 closes a valve 187. Hot water 182, which may have temperatures of about 50° C., is introduced into a bath incubator of the glass. condenser 160 through a valve 185. The hot water in the bath incubator returns to an outlet 169.

An oxygen content of the water in the tank 156 is controlled by bubbling of gases. An. oxygen gas from an oxygen gas source 172 and a nitrogen gas from a nitrogen gas source 174 may be introduced into the water in the tank 176 through an inlet 178. Amounts of the oxygen gas and the nitrogen gas may be adjusted by flow indicators. The tank 176 is connected to the tank 156, and the gas in the tank 176 may be introduced into the water in the tank 156 through an inlet 157.

Two portions by volume of one of six cation exchange resins was mixed with one portion by volume of the anion exchange resin, and the mixture was packed in the column 166 of the testing apparatus to form a mixed bed having a height of about 10 cm. The six cation exchange resins are the same except for the crosslinking degree.

Deionized, pure water having a concentration of a dissolved oxygen gas of about 20 ppb was circulated in the recirculating line to pass through the column 168 at a linear velocity of 100 meter per hour to determine a rate of elution of a total organic carbon (TOC).

Figure 4:
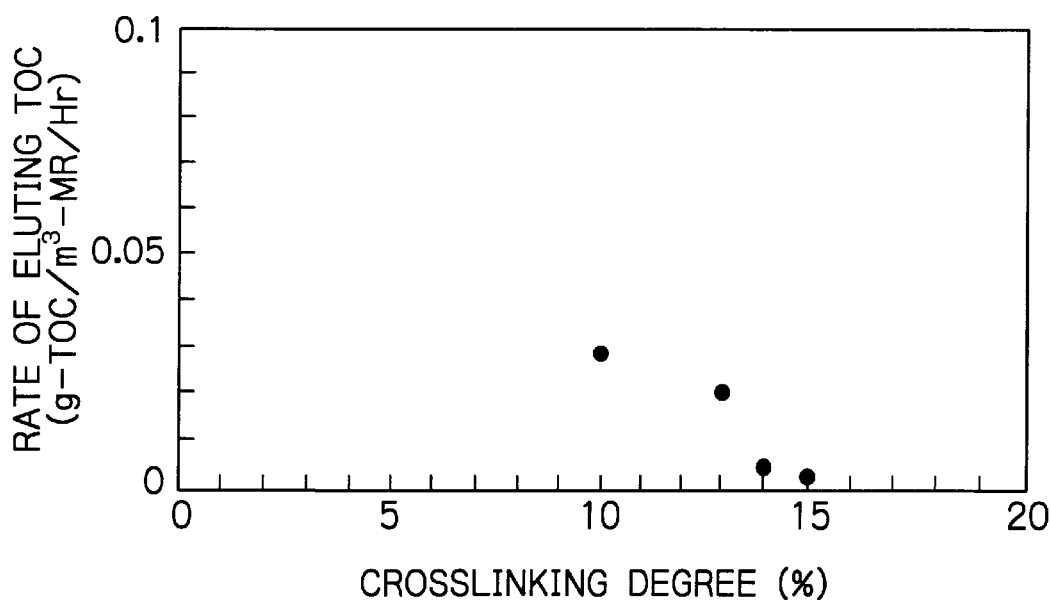
FIG. 4 is a graph showing the correlation between the crosslinking degree of the cation exchange resin and a rate of eluting organic impurities therefrom.

The results are shown in FIG. 4. FIG. 4 shows that the cation exchange resin having higher crosslinking degree elutes less TOC.

The cation exchange resin has an improved, ion exchange capacity, thereby decreasing the frequency of changing the condensate.

While this invention has been described with an emphasis upon preferred embodiments, it will be obvious to those of ordinary skill in the art that variations of the preferred embodiments may be used and that it is intended that the invention may be practiced otherwise than as specifically described herein. Accordingly, this invention includes all modifications encompassed within the spirit and scope of the invention as defined by the following claims.

What is claimed is:

1. An apparatus for deionizing water, comprising:
a secondary cooling water system for a PWR nuclear power plant which contains in the system a steam generator and a condenser, and which has a mixture of an anion exchange resin and a gel-type cation exchange resin having a crosslinking degree of about 12 to 16% therein.

2. An apparatus of claim 1 wherein the anion exchange resin and the cation exchange resin forms a bed.

3. An apparatus of claim 1 wherein the cation exchange resin has a crosslinking degree of about 14%.

4. An apparatus of claim 1 wherein the cation exchange resin comprises a plurality of particles having a substantially uniform particle diameter.

5. An apparatus of claim 1 wherein the secondary cooling water system further comprises a prefilter in an upstream of the mixture.

6. An apparatus of claim 5 wherein the prefilter comprises at least one of a filter assembly containing hollow-fiber membranes, a filter assembly containing a precoatable filter element and a filter assembly containing a pleated, filter element.

7. An apparatus of claim 1 wherein the mixture of the anion exchange resin and the gel-type cation exchange resin has a rate of elution of a total organic carbon of less than 0.03 g-TOC/$m^3$-MR/hr.

* * * * *